United States Patent [19]

Sakai

[11] Patent Number: 5,627,603
[45] Date of Patent: May 6, 1997

[54] IMAGE PROCESSING APPARATUS UTILIZING A CONVENTIONAL SIGNAL PROCESSOR TO PROCESS HIGH-DEFINITION ELECTRONIC CAMERA SIGNALS

[75] Inventor: Shinji Sakai, Yokohama, Japan

[73] Assignee: Canon Kabushiki Kaisha, Tokyo, Japan

[21] Appl. No.: 671,079

[22] Filed: Jun. 27, 1996

Related U.S. Application Data

[63] Continuation of Ser. No. 81,163, Jun. 25, 1993, abandoned.

[30] Foreign Application Priority Data

Jun. 30, 1992 [JP] Japan .................. 4-196588

[51] Int. Cl.6 ........................................ H04N 9/64
[52] U.S. Cl. ..................... 348/708; 348/222; 348/231; 348/719
[58] Field of Search ................ 348/222, 231, 348/571, 708, 714, 721, 719; 358/21 R, 160, 37, 166, 41, 909, 909.1, 433; 382/302, 304, 232; H04N 5/228, 5/76, 5/14, 9/64

[56] References Cited

U.S. PATENT DOCUMENTS

| | | | |
|---|---|---|---|
| 4,939,586 | 7/1990 | Nabati et al. | 358/342 |
| 5,027,214 | 6/1991 | Fujimori | 348/231 |
| 5,077,810 | 12/1991 | D'Luna | 382/41 |
| 5,148,292 | 9/1992 | Kutaragi | 358/433 |
| 5,295,077 | 3/1994 | Fukuoka | 358/433 |
| 5,343,243 | 8/1994 | Maeda | 348/231 |

FOREIGN PATENT DOCUMENTS

| | | | |
|---|---|---|---|
| 0296948 | 12/1988 | European Pat. Off. | H04N 9/82 |
| 0456369 | 11/1991 | European Pat. Off. | H04N 5/14 |
| 4008634 | 9/1991 | Germany | H04N 5/907 |
| 63-031282 | 2/1988 | Japan | H04N 5/907 |

Primary Examiner—Sherrie Hsia
Attorney, Agent, or Firm—Fitzpatrick, Cella, Harper & Scinto

[57] ABSTRACT

An image processing apparatus utilizing a conventional standard signal processor which is economically produced to perform processing of signals from a high-definition electronic camera. The apparatus comprises a first memory for sequentially storing input image data along a scanning line in pixel units, a control unit for sequentially reading out the image data stored in the first memory in a scanning line direction by a plurality of pixels in a vertical direction in scanning line units, a converter for converting the image data sequentially read out of the first memory into parallel image data, and a standard signal processor for performing a predetermined signal processing based on the parallel image data outputted from the converter.

14 Claims, 6 Drawing Sheets

F I G. 5

| BLOCK | H1, H2 | V1, V2 |
|---|---|---|
| TOP-LEFT | H-1 | V-1 |
| TOP-RIGHT | H-2 | V-1 |
| BOTTOM-LEFT | H-1 | V-2 |
| BOTTOM-RIGHT | H-2 | V-2 |

IMAGE PROCESSING APPARATUS UTILIZING A CONVENTIONAL SIGNAL PROCESSOR TO PROCESS HIGH-DEFINITION ELECTRONIC CAMERA SIGNALS

This application is a continuation of application Ser. No. 08/081,163, filed Jun. 25, 1993, now abandoned.

BACKGROUND OF THE INVENTION

The present invention relates to an image processing apparatus used in a high-definition electronic still camera which includes a solid-state image sensor such as a CCD having a large number of pixels.

FIG. 1 shows a standard signal processor used in a conventional, standard TV format electronic still camera.

In FIG. 1, reference numeral 1 denotes an electronic still camera comprising CCD 2, sample hold circuit 3 and A/D converter 4; 5, a standard signal processor for processing image data outputted from the electronic still camera 1 and generating a luminance signal and color difference signals; 6, a timing signal generator for generating timing signals such as clock signals for controlling inner circuits of the standard signal processor 5; 7 and 8, D/A converters for converting the luminance signal and the color difference signals which are digital signals into analog signals.

The standard signal processor 5 comprises one-horizontal line (1H) delay circuits 9 and 10, luminance signal processor 11, color signal processor 12, modulator 13 for modulating the color difference signals, and delay circuit 14 for delaying the luminance signal so as to synchronize the luminance signal and the color difference signals modulated by the modulator 13. Image data from the electronic still camera 1, and image data respectively delayed by the 1H delay circuits 9 and 10, are directly supplied to the luminance signal processor 11 and the color signal processor 12.

Next, the operation of the standard signal processor 5 having the above construction will be described below.

Output from the CCD 2 of the electronic still camera 1 is sampled by the sample hold circuit 3 at predetermined periods and converted by the A/D converter 4 into digital image data. The image data is directly supplied via the 1H delay circuit 9, and further, via both the 1H delay circuits 9 and 10, to the luminance signal processor 11 and the color signal processor 12 of the standard signal processor 5.

Accordingly, the luminance signal processor 11 and the color signal processor 12 respectively perform a predetermined signal processing using current image data and image data 1H prior to the current image data and image data 1H after the current image data, and generate a luminance signal and two color difference signals. The luminance signal is inputted into the D/A converter 7 via the delay circuit 14 and converted by the D/A converter 7 into an analog signal and transmitted to devices such as a recording unit and a monitor. The color difference signals are modulated by the modulator 13 using a predetermined modulation method and converted by the D/A converter 8 into analog signals and also transmitted to the recording unit, the monitors and the like. It should be noted that the digital luminance signal and the digital color difference signals can be composed and outputted as a composite signal.

Besides the standard TV format electronic still camera having the construction as described above, a high-definition electronic still camera having a CCD, the number of pixels of which is larger than the CCD 2 of the above construction, is known.

In the high-definition electronic still camera, as the number of pixels in a horizontal direction and that in a vertical direction are larger than those in the standard TV format electronic still camera, one or some of the following problems occur when the standard signal processor 5 as shown in FIG. 1 is used in the high-definition camera:

(1) The 1H delay circuits 9 and 10 are required to have the ability to process pixel information for one horizontal line. Their capacities are insufficient for the high-definition electronic still camera since the number of pixels in one horizontal line of this camera in the high-definition format is larger than the standard TV format.

(2) The CCD 2 has a portion for obtaining a black level as a reference level. Since the high-definition camera has a portion for obtaining a black level at a different position and the number of pixels of this portion is different from that of the standard TV format camera, the black level obtained cannot be evaluated correctly.

(3) Since periods of synchronous signals and a blanking period in the high-definition camera are different from those in the standard TV format camera, the timings of these signals cannot be correctly obtained.

(4) Since the arrangement of filters (color-arrangement) of the color filter provided in the CCD of the high-definition camera is different from that of the standard TV format camera, signals cannot be correctly processed.

For these reasons, a signal processor for the high-definition electronic still camera has been provided. Alternatively, at least one process has been omitted in the camera side and the omitted process has been performed upon image reproduction. In the former case, compared with the standard signal processor 5, the signal processor for the high-definition camera should be greater in scale, which causes an economic problem. In the latter case, as the camera side cannot complete all the necessary processings before recording, the process upon reproduction becomes complicated. Further, if information is not separated into luminance information and color information at the camera side, data compression upon recording becomes difficult.

SUMMARY OF THE INVENTION

The present invention has been made in consideration of the above situation, and has as its object to provide an image processing apparatus for utilizing the conventional standard signal processor which is economically produced to perform signal processing in the high-definition electronic still camera.

Accordingly, the foregoing object is attained by providing an image processing apparatus comprising: a first memory for storing input image data along with a scanning line in pixel units; control means for sequentially reading out the image data stored in the first memory by a plurality of pixels and shifting the reading out of the image data in a direction orthogonal to a reading-out direction; conversion means for obtaining data corresponding to a plurality of lines with respect to the reading-out direction; and a standard signal processor for performing a predetermined signal processing based on the image data outputted from the conversion means.

In the above construction, signals for substantially plural lines to be processed can be supplied as parallel data from the first memory to the standard signal processor in one-horizontal line pixel units. The standard signal processor can deal with an arbitrary number of horizontal pixels, thus, a signal for image data having a large number of pixels such as an image data from a high-definition electronic still camera can be processed.

Further, another object of the present invention is to provide an image processing apparatus comprising: a first memory for storing input image data along with a scanning line in pixel units; control means for dividing the image data stored in the first memory into a plurality of blocks, and reading out the image data blocks sequentially in block units; and a standard signal processor for performing a predetermined signal processing based upon the image data read out in block units from the first memory.

In the above construction, when a high-definition electronic still camera is used, image data is temporarily stored in the first memory, then the stored image data is divided into blocks, the number of pixels in each block corresponds to that in each block of a standard resolution electronic still camera. The signal processing can be performed in the block units, enabling the signal processor of the standard resolution electronic still camera to perform signal processing in the high-definition electronic still camera.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram for explaining a divisional process of an image in the second embodiment.

DETAILED DESCRIPTION OF THE PREFERRED EMBODIMENTS

Preferred embodiments of the present invention will be described in detail in accordance with the accompanying drawings.

[First Embodiment]

Figure 2:
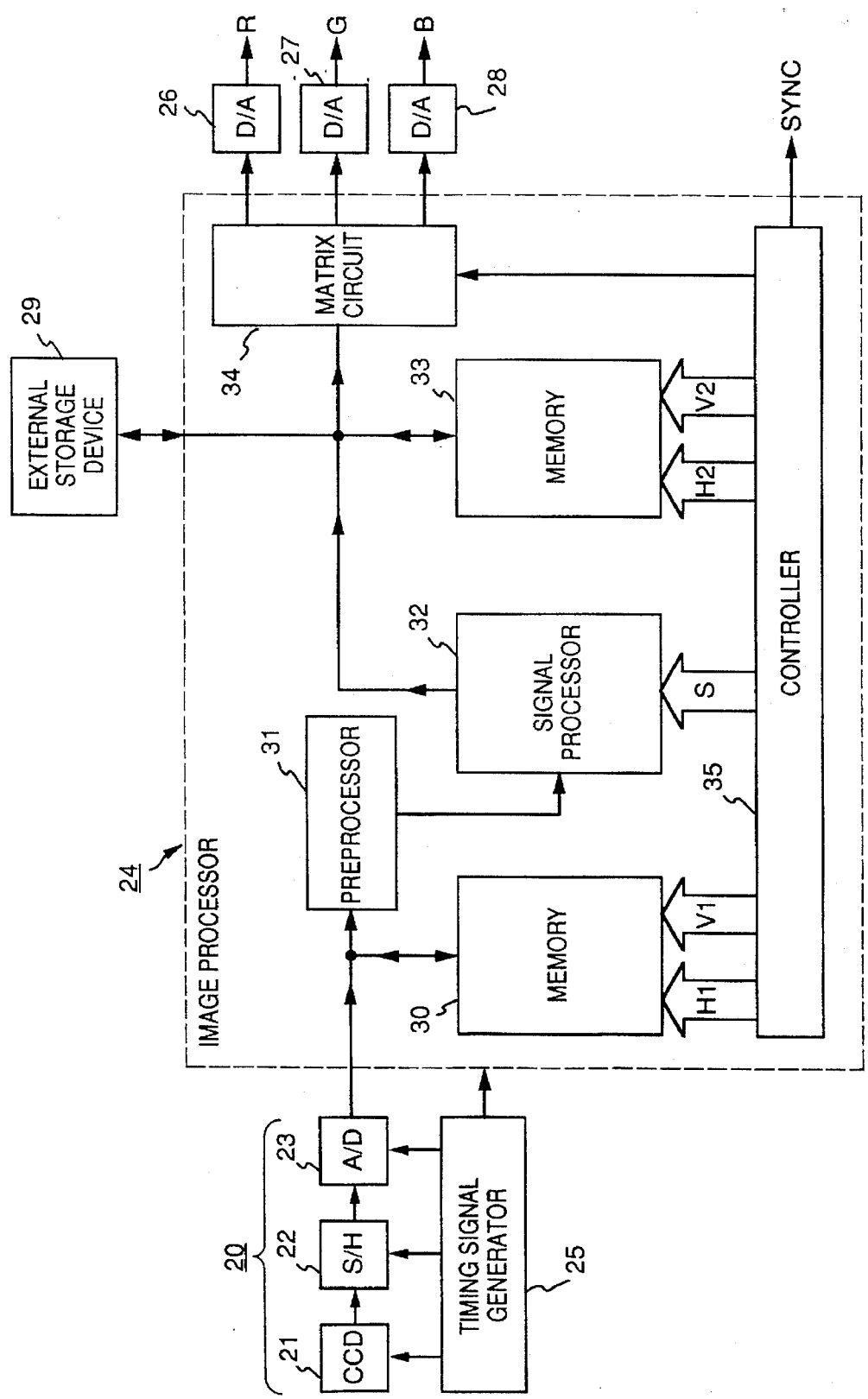
FIG. 2 is a block diagram showing the configuration of an image processing apparatus according to a first embodiment of the present invention.

FIG. 2 shows the configuration of the image processing apparatus according to the first embodiment.

In FIG. 2, reference numeral 20 denotes a high-definition electronic still camera which comprises CCD 21 having more pixels than those in a standard TV format electronic still camera, sample hold circuit 22 and A/D converter 23, and image processor 24 for processing image data outputted from the electronic still camera 20 and generating RGB color signals. In this embodiment, the image processor 24 is a one-chip LSI. Numeral 25 denotes a timing signal generator for generating timing signals such as clock signals for controlling the electronic still camera 20 and respective internal circuits of the image processor 24; 26 to 28 denote D/A converters for converting the digital RGB color signals outputted from the image processor 24 into analog RGB color signals; and 29 denotes an external storage device for storing a luminance signal and color difference signals from the image processor 24.

The image processor 24 comprises memory 30 in which image data from the electronic still camera 20 (e.g., image data for one image) is stored, preprocessor 31 which performs preprocessing of the image data read out of the memory 30, signal processor 32 which processes the preprocessed image data and generates a luminance signal and color difference signals, memory 33 in which the luminance signal and the color difference signals are temporarily stored, matrix circuit 34 which matrix-processes the respective signals read out of the memory 33 and generates RGB color signals, and controller 35 which controls all the circuits.

The CCD 21 has a color filter on its front surface to obtain color image information of a subject. The color filter includes a mosaic of filters for colors such as cyan (C), magenta (M), yellow (Y) and green (G) to allot color information to each pixel of the CCD 21, and the signal processor 32 performs signal processing in the color-arrangement of the CCD 21. However, if the color-arrangement of the color filter is different from that of the signal processor 32, since there are various arrangements of filters, the signal processor 32 cannot process color information from the CCD. In such case, the preprocessor 31 adjusts the color-arrangement of pixel information for one image stored in the memory 30 and inputs the information having the adjusted color-arrangement into the signal processor 32. In this manner, the preprocessor 31 enables the signal processor 32 to process the information even though the color-arrangements of the CCD and the signal processor do not coincide.

Figure 3:
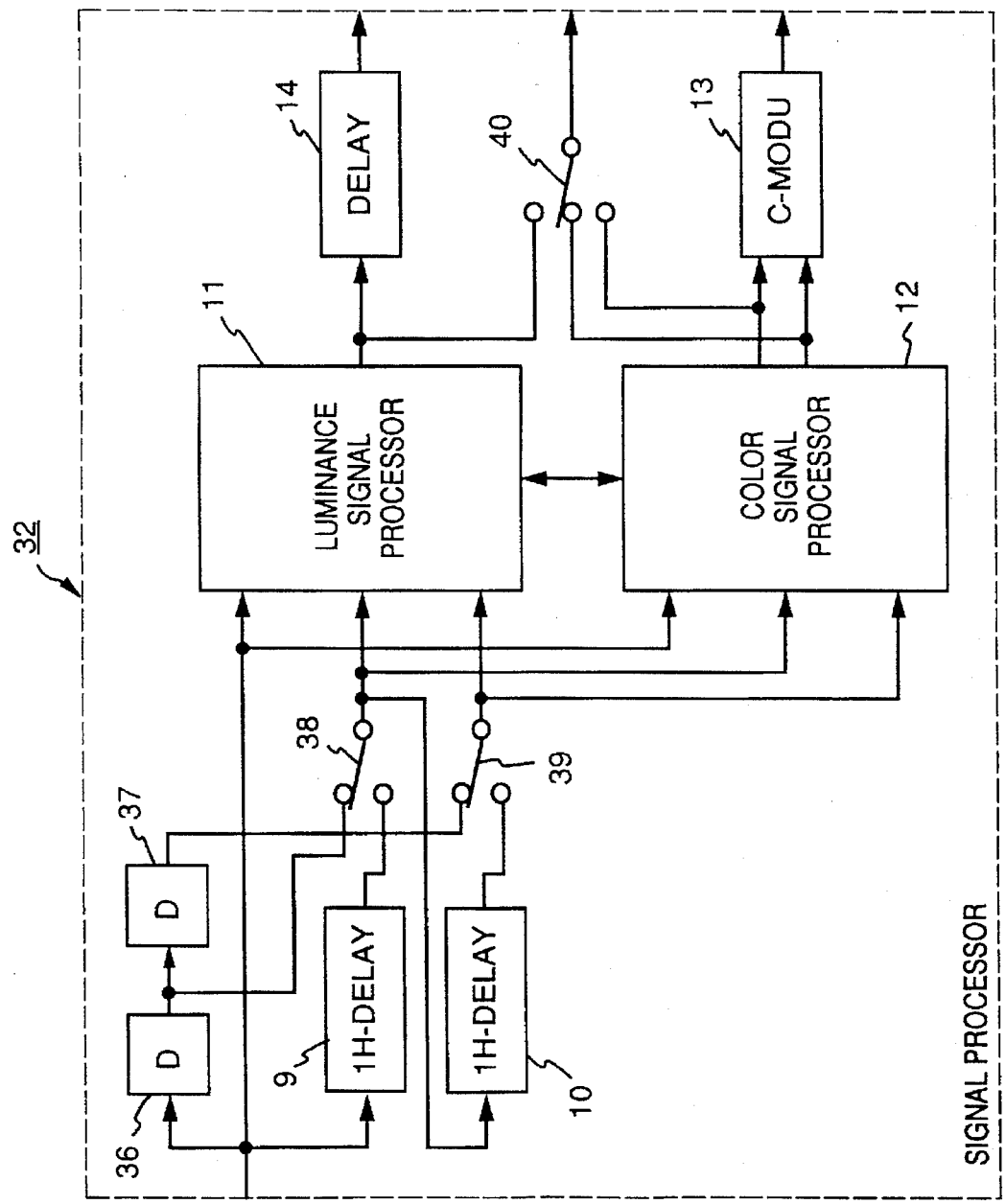
FIG. 3 is a block diagram showing the construction of a signal processor in the first embodiment.

FIG. 3 shows the construction of the signal processor 32.

The signal processor 32 comprises two pixel memories 36 and 37 for delaying input image data for one pixel, switches 38 and 39 for switching over outputs from the pixel memories 36 and 37 and outputs from the 1H delay circuits 9 and 10. The signal processor 32 further comprises switch 40 for switching over a luminance signal and two color difference signals.

Next, the operation of the above construction will be described below.

If the high-definition electronic still camera 20 is employed, the switches 38 and 39 in the signal processor 32 are connected to the pixel memories 36 and 37. The sample hold circuit 22 samples the output from the electronic still camera 20 at predetermined periods (normally one-pixel period), and the A/D converter 23 converts the data into digital image data in one-pixel units. The converted image data is stored in the memory 30 of the image processor 24. That is, image information for one image is stored in the memory 30 in one-pixel units.

In the image processor 24, the controller 35 supplies horizontal address H1 and vertical address V1 to the memory 30, and supplies horizontal address H2 and vertical address V2 to the memory 33. The controller 35 controls the signal processor 32 by control signal S, and it outputs horizontal synchronous signal HSYNC and vertical synchronous signal VSYNC, further, it generates a blanking signal if necessary.

Image data supplied from the electronic still camera 20 is stored in the memory 30 corresponding to horizontal and vertical addresses of each pixel on the CCD 21. Note that these addresses are logical addresses for control and physical addresses in the memory 30 are not necessarily separated as horizontal and vertical addresses.

Next, data of three pixels in a vertical direction are sequentially read out of the memory 30, i.e., each pixel data is read out three times and transmitted to the signal processor 32. However, if the color-arrangement of the color filter with respect to each pixel does not coincide with that of the signal processor 32, the preprocessor 31 changes the arrangement of the pixel data read out of the memory 30 for the color-arrangement of the signal processor 32.

Since the color arrangement of the color filter is merely a rotation of at most four different color component filters, each color is repeatedly arranged by 2-5 pixels. For this reason, in many cases, the preprocessor 31 only processes matrices of 2-3 lines in a vertical direction and 2-5 pixels in a horizontal direction (e.g., rearranges pixels). Further, by designing the CCD 21 to have a color-arrangement adjustable to that of the signal processor 32, the preprocessing can be omitted, otherwise, the number of pixels to be operated can be reduced to 2-4 pixels. In these cases, data for more than three pixels may be read out at each reading. It should be noted that in this embodiment, the signal processor 32 has two 1H delay circuits (9 and 10). If the number of the 1H delay circuits is different, the amount of data to be synchronously transmitted can be changed corresponding to the number of the 1H delay circuits.

The data preprocessed in the above manner enters the signal processor 32, in which the pixel memories 36 and 37 respectively delay the data for one pixel and input the delayed data into the luminance signal processor 11 and the color signal processor 12. The processors 11 and 12 generate a luminance signal and color difference signals from information for three pixels, i.e., a predetermined pixel, a pixel delayed for one pixel, and a pixel delayed for two pixels. These processings are performed in one-pixel units in the horizontal direction, accordingly, the processors 11 and 12 can perform signal processing corresponding to a horizontal line having a substantially arbitrary length.

In this case, a black-level signal is inputted by each line of the CCD 21. If the controller 35 provides a signal indicative of a timing to recognize a proper position or the signal processor 32 determines the proper timing, correct black-level signals can be obtained.

Regarding the vertical direction, even if data has more vertical lines than those of ordinary image data, there is no problem in data processing unless it has been abnormally processed. However, if processing one vertical line is impossible due to the limitation of a counter value in the vertical direction, two signal processors 32 can be employed for simultaneous processings of plural areas, or one signal processor 32 can be used plurality of times.

The luminance signal and the color difference signals generated by the signal processor 32 are written into the positions of the horizontal and vertical addresses H2 and V2 in the memory 33.

The respective signals inputted into the memory 33 are transmitted to the external storage device 29, otherwise, converted into RGB signals by the matrix circuit 34 and outputted to a device such as a monitor via the D/A converters 26 to 28.

Figure 1:
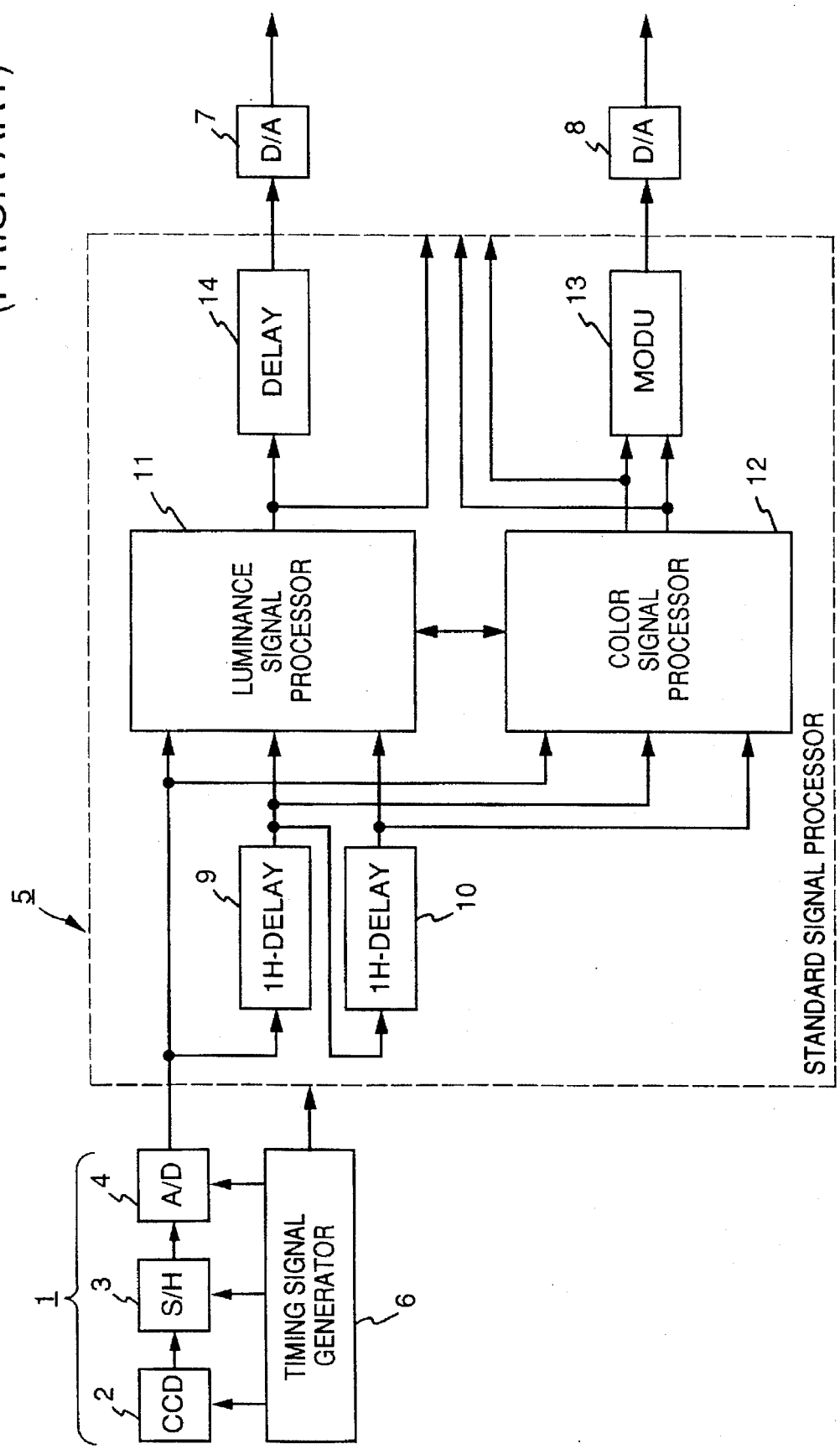
FIG. 1 is a block diagram showing the configuration of the signal processor of the conventional electronic still camera.

If the switches 38 and 39 of the signal processor 32 are switched over to the 1H delay circuits 9 and 10, the construction of the signal processor 32 becomes the same as that of the conventional standard signal processor 5 shown in FIG. 1. In this case, the standard TV format electronic still camera 1 can be connected to the signal processor 32 similarly to FIG. 1.

As described above, by connecting memories and simple additional circuits to a conventional standard signal processor, the standard signal processor can be used in processing of signals from a high-definition electronic still camera.

[Second Embodiment]

Next, the second embodiment of the present invention will be described below with reference to FIGS. 4 to 6.

Figure 4:
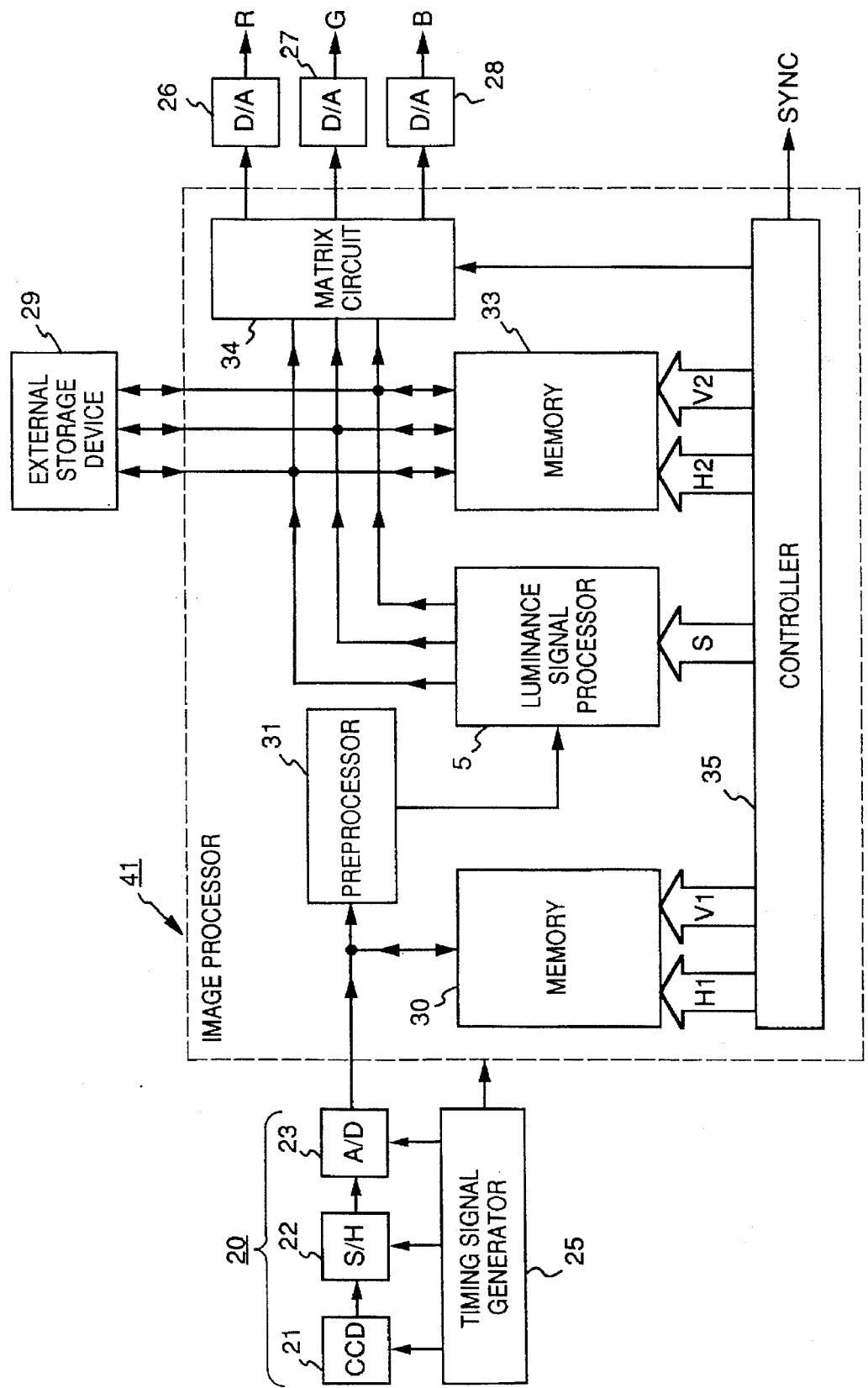
FIG. 4 is a block diagram showing the configuration of an image processing apparatus according to a second embodiment of the present invention.

FIG. 4 shows the configuration of image processor 41 according to the second embodiment. The image processor 41 has a similar configuration to that in FIG. 2 and like elements have the same reference numerals. The difference is that the signal processor 32 of FIG. 2 is replaced with the standard signal processor 5 in FIG. 1.

In this embodiment, an image inputted from the CCD 21 is divided into four blocks, i.e., top-left, top-right, bottom-left and bottom-right, and the standard signal processor 5 processes the respective blocks with the reading/writing control from/to the memories 30/33.

Figure 6A:
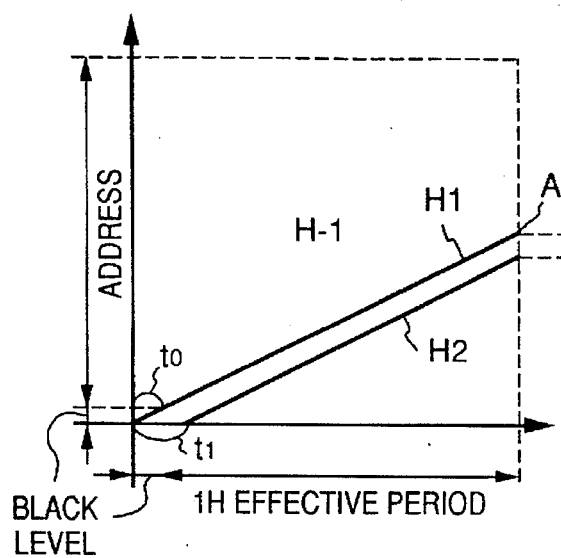
FIGS. 6A to 6D are line charts showing control method of addresses for the divisional process in FIG. 5.
Figure 6B:
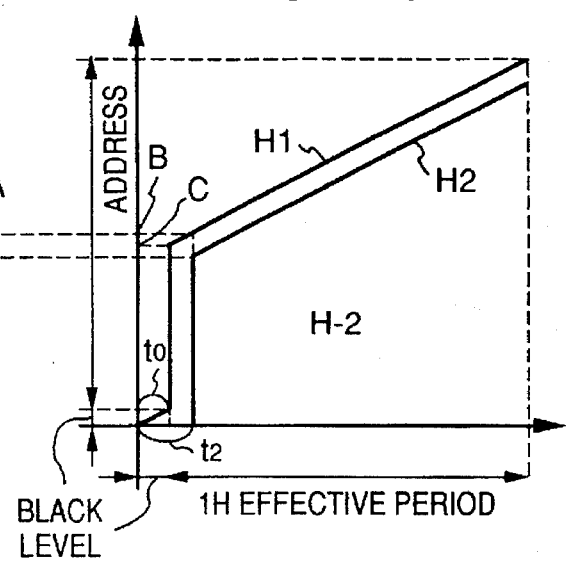
Figure 6C:
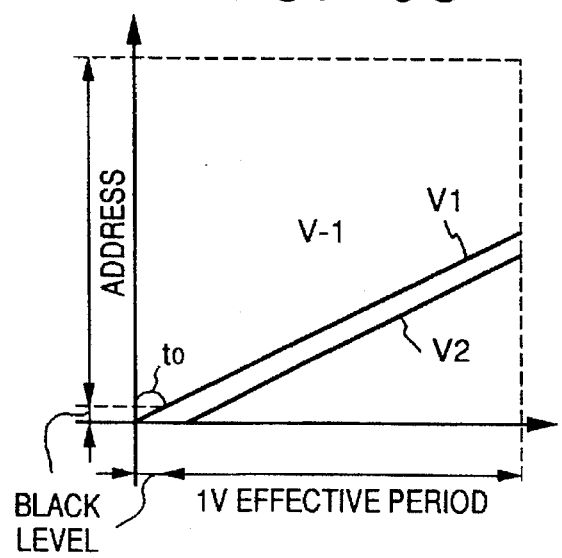
Figure 6D:
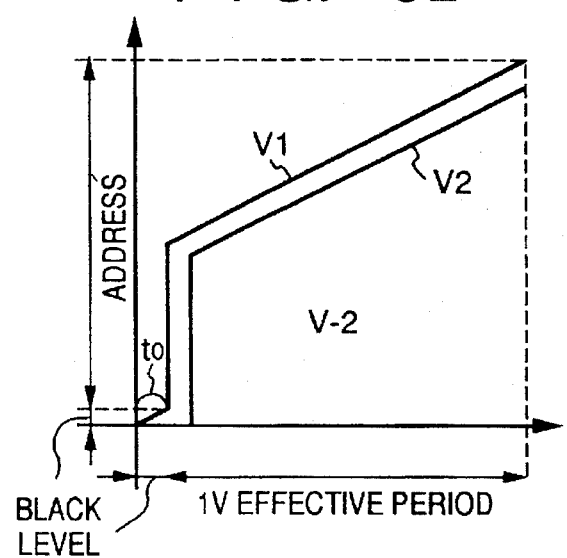

FIG. 5 shows address control methods (H - 1), (H - 2), (V - 1) and (V - 2) in the respective blocks. FIGS. 6A to 6D respectively show the pixel reading order in the address control methods. In FIG. 5, if signal processing is directed to the top-left portion, the control methods (H - 1) and (V - 1) are used; to the top-right portion, (H - 2) and (V - 1); to the bottom-left portion, (H - 1) and (V - 2); to the bottom-right portion, (H - 2) and (V - 2). The control methods (H - 1) and (H - 2) are methods using the horizontal addresses H1 and H2 as shown in FIGS. 6A and 6B, and the control methods (V - 1) and (V - 2) are methods using the vertical addresses V1 and V2 as shown in FIGS. 6C and 6D.

First, the horizontal address control methods (H - 1) and (H - 2) will be described. In (H - 1) as shown in FIG. 6A, the reading address H1, which relates to the CCD 21 output and is read out of the memory 30 to the standard signal processor 5, starts from the initial pixel (black level) of the CCD 21 data. The writing address H2, which has been processed by the signal processor 5 and is written into the memory 33, starts from a point where the signal processor 5 has finished processing of the black level (t0) and becomes capable of outputting after the internal operation time (t1). In the method (H - 1), within data read out of the memory 30 (data for the top-left portion), data read during the black level processing (t0) and data read during the operation time (t1) are not stored in the memory 33.

In the method (H - 2) as shown in FIG. 6B, the address H1 starts from a small address number corresponding to a black-level portion at the left end of the CCD 21, similarly to the method (H - 1), and jumps to an effective address immediately after the reading of the black-level portion (immediately after t0). The effective address at this time is an address by which the color (pixel) arrangement of a signal preprocessed by the preprocessor 31 becomes proper. Similarly to the method (H - 1), the address H2 starts from a point where the signal processor 5 has finished processing of the black level (t0) and becomes capable of outputting after the internal operation time (t2). Also, within data read out of the memory 30 (data for the black level portion and the top-right portion), data read during the black level processing (t0) to data at a point where the operation of the standard signal processor 5 (e. g., an internal low-pass filter) becomes stable (t2) are not stored in the memory 33.

It should be note that in order to ensure that the top-left portion and the top-right portion are properly combined, the value of the address H1 at the end of the method (H - 1) and the value of the address H1 at the beginning of the method (H - 2) should be in sequence. Assuming that the address H1 at the end of (H - 1) is A and the address H1 at the beginning of (H - 2) is B, the relation between these values should be A+1=B. Since it is desirable to avoid writing signal-processed data into the memory 33 at least during the time t2 in which the operation of the standard signal processor 5 becomes stable, in this embodiment, data in the memory 30 read during the time period (t2–t0), is not written into the memory 33, thus waiting until the operation of the signal processor 5 becomes stable. More specifically, the initial H1, at the beginning of reading of data out of the memory 30, is set to C which is smaller than A and data read from the address value C to the address value B (=A+1) is not stored in the memory 33. In this manner, in the data stored in the memory 33, the address H1 corresponding to a joint portion between (H - 1) and (H - 2) changes in a continuous manner, thus preventing improper output.

In both processes of the top-left portion and the top-right portion, the signal processor 5 can receive a signal which starts from the black level portion. In this manner, the conventional signal processor 5 can be used for signal processing in a high-definition electronic still camera without any change.

Regarding the vertical direction, reading/writing controls are performed in a similar manner to those as the horizontal direction, as shown in FIGS. 6C and 6D. It should be noted that in a case where the standard signal processor 5 does not require a black level data, data corresponding to the black level portion can be omitted and the address V1 can be preceded while the signal processor 5 outputs a stable signal. In this embodiment, the black-level processing is performed by inputting a dummy black signal, however, if the black level can be preset from the outside of the standard signal processor 5, the preset black level can be employed.

In this embodiment, an image is divided into four blocks, i.e., top-left, top-right, bottom-left and bottom-right blocks, however, the present invention is not limited to this arrangement. For example, the image can be divided in a plurality of blocks in a horizontal/vertical direction. Furthermore, a specific block can be repeatedly processed.

In this embodiment, the blocks are sequentially processed using one standard signal processor 5, however, a plurality of signal processors 5 can be used in parallel to process either a part or the whole process.

If one part of the process is processed by parallel signal processors 5, by sharing at least one portion of the H or V addresses, e.g., a top-left block and a top-right block can be simultaneously processed, a large part of the memory 30 can be commonly used.

As described above, a pair of memories 30 and 33 are used in this embodiment, however, they can be replaced with only one memory which performs the same operations of these memories. In this case, after the reading process, a portion corresponding to the memory 30 becomes available, for writing the H and V addresses, thus the whole capacity of the memory can be reduced.

Further, the CCD is used as a solid-state image sensor, however, the image sensor is not limited to the CCD. For example, one-dimensional input device such as a scanner can be used by continuously scanning and obtaining image signals. Further, the output signals are analog signals, however, digital signals can be outputted. In the first and second embodiments, the apparatus comprises a "camera", however, it can comprise a solid-state image sensor and independent processing system.

The embodiments have not been described in consideration of auxiliary functions such as white balance. If the image processing apparatus of the present invention has a white balance function, it is desirable that the balancing status is fixed during signal processing, therefore, data for this function should be specified before the signal processing so that values for the signal processing can be fixed. If the standard signal processor 5 cannot properly adjust the values, a postprocesser such as the matrix circuit 34 can be used for supplementary adjustment. This output processor may be placed between the signal processor and the memory 33. Further, the adjustment process can be performed by computer software, depending upon the extent of the process.

If the process speeds of the preprocessor and postprocessor are limited, the initial signal processing speed can be changed.

The above embodiments have not been described in consideration of interlacing (interlaced scanning), since most standard signal processors do not use correlation among fields and they virtually perform signal processing regardless of interlaced/non-interlaced scanning. Note that when a signal processor is originally for an interlacing CCD and interlacing is performed by the image processing apparatus of the present invention, if signals obtained are treated as non-interlaced signals, the signal processing may be performed properly.

Though there is no direct relation with the interlacing, there is a system in which ODD/EVEN fields have different pixel arrangements (or at least different starting positions of pixel arrangements). In such system, signals can be generated corresponding to the respective pixel arrangements, or the signal processor can be reset for each process to select a necessary field. Further, the processor status can be detected so that the fields are processed at a timing based upon the detected status.

The present invention can be applied to a system constituted by a plurality of devices, or to an apparatus comprising a simple device. Furthermore, it is evident that the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   a first memory for storing input image data along a scanning line in pixel units;
   control means for dividing the image data stored in said first memory into a plurality of blocks, and reading out the image data blocks sequentially in block units; and
   a standard signal processor for performing a predetermined signal processing based on the image data read out in the block units;
   wherein said standard signal processor generates at least one of a luminance signal and color difference signals by operating on the image data sequentially read out of said first memory in a predetermined block unit.

2. The image processing apparatus according to claim 1, wherein, information for one image of the input image data, at a time, is stored in said first memory.

3. The image processing apparatus according to claim 1, wherein said standard signal processor generates at least one of the luminance signal and the color difference signals from the image data obtained by a standard resolution electronic camera.

4. The image processing apparatus according to claim 3, wherein the input image data is an image data outputted from a high-definition electronic camera, and the plurality of blocks are blocks divided by the number of pixels corresponding to a number of pixels for one image by the standard resolution electronic camera.

5. The image processing apparatus according to claim 4, wherein when said standard signal processor processes a block of said plurality of blocks which does not include a black level detecting portion at an end portion of an image of the high-definition electronic camera, said control means reads information of the black level detecting portion out of said first memory, and reads out image information of the block which does not include the black level detecting portion.

6. The image processing apparatus according to claim 1, further comprising a second memory for storing output data from said standard signal processor.

7. An image processing apparatus comprising:

a first memory for storing input image data along a scanning line in pixel units;

control means for dividing the image data stored in said first memory into a plurality of blocks, and for reading out the image data blocks sequentially in block units; and a standard signal processor for performing a predetermined signal processing based upon the image data read out in the block units, said standard signal processor generating at least one of a luminance signal and color difference signals from image data obtained by a standard resolution electronic camera.

8. Apparatus according to claim 7, wherein the input image data comprises image data outputted from a high-definition electronic camera, and wherein the plurality of blocks are blocks divided by the number of pixels corresponding to a number of pixels for one image by the standard resolution electronic camera.

9. Apparatus according to claim 8, wherein when said standard signal processor processes a block of said plurality of blocks which does not include a black level detecting portion at an end portion of an image of the high-definition electronic camera, said control means reads information of the black level detecting portion out of said first memory, and reads out image information of the block which does not include the black level detecting portion.

10. Apparatus according to claim 7, further comprising a second memory for storing output data from said standard signal processor.

11. An image processing apparatus comprising:

a first memory for storing input image data along a scanning line in pixel units;

control means for dividing the image data stored in said first memory into a plurality of blocks, and for reading out the image data blocks sequentially in block units; and a low-definition signal processor for performing a predetermined signal processing based upon the image data read out in the block units, said low-definition signal processor generating at least one of a luminance signal and color difference signals from image data obtained by a low definition electronic camera.

12. Apparatus according to claim 11, wherein the input image data comprises image data outputted from a high-definition electronic camera and wherein each of the plurality of blocks has a number of pixels which can be processed by the low-definition electronic camera as one block.

13. Apparatus according to claim 12, wherein when said low-definition signal processor processes one of said plurality of blocks which does not include a block level detecting portion, said control means reads information of a black level detecting portion of the image data outputted from the high-definition electronic camera out of said first memory, and reads out image information of a block which does not include the black level detecting portion.

14. Apparatus according to claim 11, further comprising a second memory for storing output data from said low-definition signal processor.

* * * * *

UNITED STATES PATENT AND TRADEMARK OFFICE
CERTIFICATE OF CORRECTION

PATENT NO. : 5,627,603

DATED : May 6, 1997

INVENTOR(S) : Shinji SAKAI

It is certified that error appears in the above-identified patent and that said Letters Patent is hereby corrected as shown below:

COLUMN 5:
    Line 62, "otherwise" should read --otherwise, they are--.

COLUMN 7:
    Line 1, "note" should read --noted--.

COLUMN 8:
    Line 32, "such" should read --such a--.

COLUMN 9:

Line 36, "comprises" should read --comprises an--.

COLUMN 10:
    Line 23, "low definition" should read --low-definition--; and
    Line 32, "block" should read --black--.

Signed and Sealed this

Thirtieth Day of June, 1998

*Attest:*

BRUCE LEHMAN

*Attesting Officer*       *Commissioner of Patents and Trademarks*